United States Patent
Fu et al.

(10) Patent No.: US 8,265,164 B2
(45) Date of Patent: Sep. 11, 2012

(54) METHOD AND APPARATUS FOR DETERMINING WHETHER ADJACENT MACROBLOCKS ARE LOCATED IN THE SAME SLICE

(75) Inventors: Frank Fu, Taipei (TW); Sean Lee, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1443 days.

(21) Appl. No.: 11/778,460

(22) Filed: Jul. 16, 2007

(65) Prior Publication Data

US 2008/0285657 A1 Nov. 20, 2008

(30) Foreign Application Priority Data

May 18, 2007 (TW) ................................ 96117816 A (51) Int. Cl.
H04N 7/12 (2006.01)

(52) U.S. Cl. ........... 375/240.24; 375/240.1; 375/240.12; 375/240.13; 375/240.14; 375/240.15; 375/240.16; 375/240.25; 375/240.26; 375/240.29; 348/715; 348/716; 348/717; 348/718; 348/719

(58) Field of Classification Search .................... None
See application file for complete search history.

(56) References Cited

U.S. PATENT DOCUMENTS

| | | | | |
|---|---|---|---|---|
| 7,949,051 B2 * | 5/2011 | Yankilevich | ............. | 375/240.24 |
| 2006/0029135 A1 * | 2/2006 | Zhou et al. | ................ | 375/240.12 |
| 2007/0183508 A1 * | 8/2007 | Kudo et al. | ............... | 375/240.25 |
| 2007/0201559 A1 * | 8/2007 | He | ............. | 375/240.24 |
| 2007/0223595 A1 * | 9/2007 | Hannuksela et al. | .... | 375/240.26 |
| 2007/0230582 A1 * | 10/2007 | Chiu et al. | ................ | 375/240.24 |
| 2007/0253491 A1 * | 11/2007 | Ito et al. | .................... | 375/240.24 |
| 2008/0056347 A1 * | 3/2008 | Chiu et al. | ..................... | 375/240 |
| 2008/0159407 A1 * | 7/2008 | Yang et al. | ............... | 375/240.25 |
| 2008/0232460 A1 * | 9/2008 | Sadowksi et al. | ......... | 375/240.01 |
| 2008/0240254 A1 * | 10/2008 | Au et al. | ................... | 375/240.24 |
| 2009/0010332 A1 * | 1/2009 | Jeon et al. | ................. | 375/240.12 |
| 2009/0257664 A1 * | 10/2009 | Kao et al. | ...................... | 382/232 |

* cited by examiner

*Primary Examiner* — Yin-Chen Shaw
*Assistant Examiner* — Canh Le
(74) *Attorney, Agent, or Firm* — Muncy, Geissler, Olds & Lowe, PLLC (57) ABSTRACT

The present invention is directed to a method for determining whether a current macroblock and an adjacent macroblock thereof are located in the same slice. The method is used in a predetermined process for a block-based digitally encoded image. The block-based digitally encoded image is represented as an encoded bit-stream and each macroblock therein is assigned a sequence characteristic number. The method includes: providing a memory space for storing and tracing a slice changing point; initializing the slice changing point to a predetermined number; checking the encoded bit-stream, and when the current slice is determined to change, setting the slice changing point to a derived sequence characteristic number derived from the sequence characteristic number of the current macroblock; and determining whether the current macroblock and the adjacent block thereof are in the same slice according to a comparison result between the sequence characteristic number of the adjacent block and the slice changing point. The invention also discloses an apparatus for performing the method.

12 Claims, 7 Drawing Sheets

| 0 | 2 | 4 | 6 | 8 | 10 | 12 | 14 |
| 1 | 3 | 5 | 7 | 9 | 11 | 13 | 15 |
| 16 | 18 | 20 | 22 | 24 | 26 | 28 | 30 |
| 17 | 19 | 21 | 23 | 25 | 27 | 29 | 31 |
| 32 | 34 | 36 | 38 | 40 | 42 | 44 | 46 |
| 33 | 35 | 37 | 39 | 41 | 43 | 45 | 47 |
| 48 | 50 | 52 | 54 | 56 | 58 | 60 | 62 |
| 49 | 51 | 53 | 55 | 57 | 59 | 61 | 63 |

| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

| 0 | 1 | 2 | 3 | 4 | 5 | 6 | 7 |
| 0 | 1 | 2 | 3 | 4 | 5 | 6 | 7 |
| 8 | 9 | 10 | 11 | 12 | 13 | 14 | 15 |
| 8 | 9 | 10 | 11 | 12 | 13 | 14 | 15 |
| 16 | 17 | 18 | 19 | 20 | 21 | 22 | 23 |
| 16 | 17 | 18 | 19 | 20 | 21 | 22 | 23 |
| 24 | 25 | 26 | 27 | 28 | 29 | 30 | 31 |
| 24 | 25 | 26 | 27 | 28 | 29 | 30 | 31 |

METHOD AND APPARATUS FOR DETERMINING WHETHER ADJACENT MACROBLOCKS ARE LOCATED IN THE SAME SLICE

CROSS-REFERENCE TO RELATED APPLICATION

This application claims the priority benefit of application No. 096117816, filed in Taiwan, R.O.C. on May 18, 2007 under 35 U.S.C. §119.

BACKGROUND OF THE INVENTION

1. Field of the Invention

The present invention is related to digital image processing technology, particularly to a method and apparatus for determining whether adjacent macroblocks are located in the same slice in the deblocking process of block-based digitally encoded image.

2. Description of the Prior Art

Figure 1:
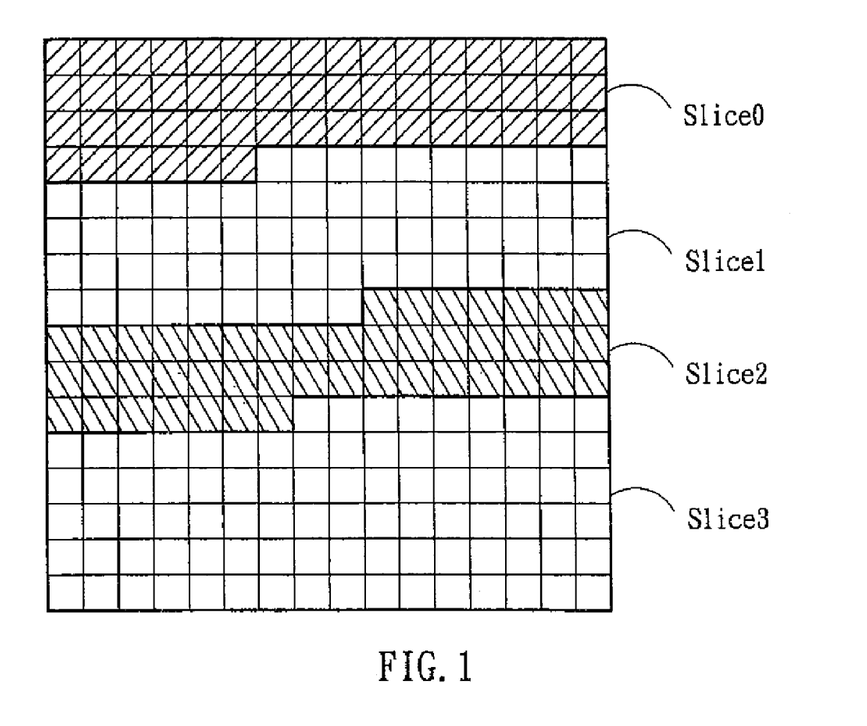
FIG. 1 illustrates a blocked-based digital picture including several slices.

A block-based digitally encoded image frame is usually partitioned into macroblocks (MB), and luminance and chroma components of pixels (picture elements) therein are encoded separately. A macroblock typically refers to an image area containing 16×16 pixels. In the video coding protocol like H.264, a macroblock may be further divided into several 16×8, 8×16, 8×8, 8×4, 4×8, or 4×4 partitions or sub-partitions. A slice is a sequence of macroblocks. A picture may be split into one or several slices as shown in FIG. 1. FIG. 1 illustrates a blocked-based digital image 100 including several slices. There are 4 slices Slice0-Slice3 in the blocked-based digital image 100. Slices are self-contained in the sense that given the active sequence and picture parameter sets, their syntax elements can be parsed from the bit-stream and the values of the samples in the area of the picture that the slice represents can be correctly decoded without use of data from other slices provided that utilized reference pictures are identical at encoder and decoder.

Figure 2:
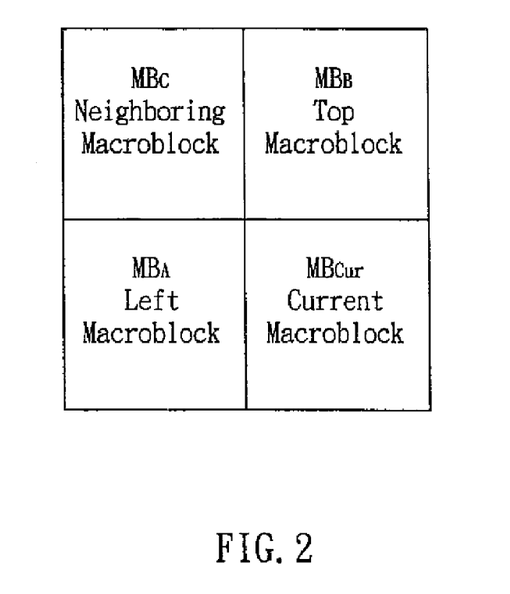
FIG. 2 illustrates the spatial relationship between the current macroblock and its neighboring macroblocks.

Visual defects, such as blocking effects, usually appear in blocked-based decoded images. A deblocking process is generally employed to remove or mitigate such defects so as to improve the decoded image quality. In the protocol like H.264, it may choose whether to execute the deblocking process for adjacent macroblocks across slices or not. Referring to FIG. 2, it illustrates the spatial relationship of the current macroblock $MB_{Cur}$ and its neighboring macroblocks $MB_A$, $MB_B$ and $MB_C$, in which the current macroblock $MB_{Cur}$ is the macroblock under decoding or processing, the macroblock $MB_A$ lies to the left of the current macroblock $MB_{Cur}$, and the macroblock $MB_B$ is located exactly above the current macroblock $MB_{Cur}$. The macroblocks $MB_A$ and $MB_B$ are generally referred to as the left macroblock and the top macroblock of the current macroblock $MB_{Cur}$ respectively. If the current macroblock $MB_{Cur}$ and its adjacent macroblock $MB_A$ (or $MB_B$) lie in different slices, then it may choose to skip the deblocking process for the boundary between macroblocks $MB_{Cur}$ and $MB_A$ (or $MB_B$). Therefore, it is desirable to determine whether any adjacent macroblocks are in the same slice in the image decoding operation containing a deblocking process.

A straightforward way to determine whether adjacent macroblocks are in the same slice is to record the slice of every macroblock during the decoding process. As shown in FIG. 2, if the slices of macroblock $MB_{Cur}$ and all its adjacent blocks are recorded, then it can be used to determine whether adjacent macroblocks are in the same slice in any subsequent process. However, total number of slices in a digitally encoded picture may be equal to the amount of macroblocks contained therein, that is, each slice contains one macroblock only. For instance, if there are 1920×1024 pixels in a digitally encoded image, then the image would include 7680 (1920×1024 divided by 16×16) macroblocks. In the worst case, the image may include 7680 slices, which means temporary memory spaces of 7680 slice numbers should be reserved in the system memory to record slice numbers of all macroblocks. If a slice number takes up 13 bits, then totally 12480 bytes should be reserved (7680×13 bits=99840 bits=99840/8 bytes=12480 bytes).

In view of the foregoing, there is a heed to provide an improved method for determining whether adjacent macroblocks are in the same slice to avoid wasting system memory resources.

SUMMARY OF THE INVENTION

One aspect of the present invention is to provide a method for determining whether adjacent macroblocks are located in the same slice, the method using very limited memory resources.

Another aspect of the present invention is to provide an apparatus for determining whether adjacent macroblocks are located in the same slice, the apparatus using very limited memory resources for the slice determining task.

The present invention is directed to a method for determining whether two adjacent macroblocks are located in the same slice. The method may be applied in a specific process, such as a deblocking process, for a block-based digitally encoded image. The block-based digitally encoded image is represented as an encoded bit-stream and each macroblock therein is assigned a sequence characteristic number. The method includes: providing a memory space for storing and tracing a slice changing point; initializing the slice changing point to a predetermined initial value; checking the encoded bit-stream, and when the current slice is determined to change, then setting the slice changing point to a derived sequence characteristic number derived from the sequence characteristic number of the current macroblock; and determining whether the current macroblock and the adjacent block thereof are in the same slice according to a comparison result between the sequence characteristic number of the adjacent block and the slice changing point.

The invention also discloses an apparatus for performing the method.

DETAILED DESCRIPTION OF THE INVENTION

Preferred embodiments in accordance with the present invention will now be described in detail with the accompanying drawings. The present invention should not be limited to any single embodiment, but rather construed in breadth and scope in accordance with the appended claims.

Figure 3:
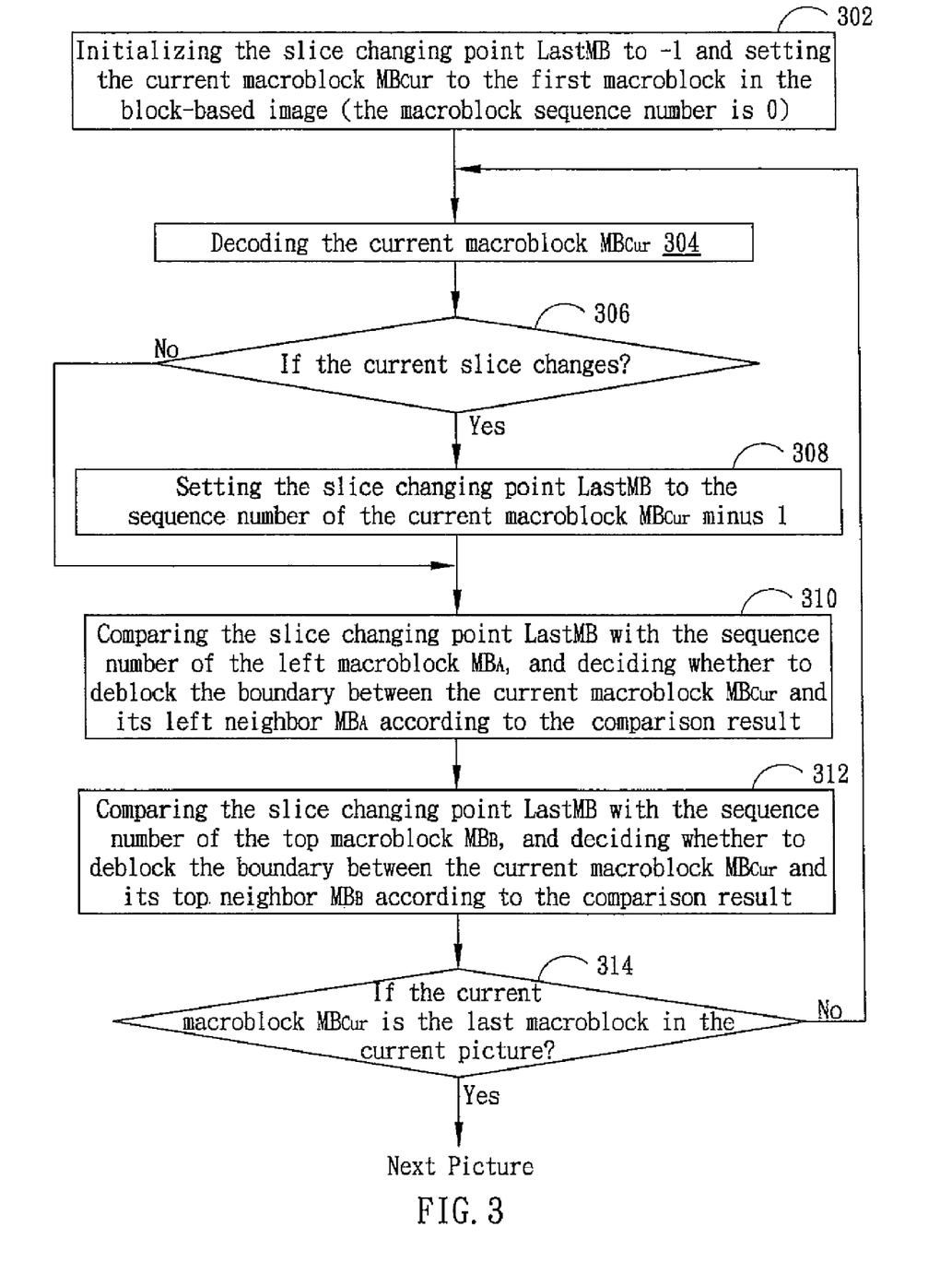
FIG. 3 shows the flow diagram of the method for determining whether adjacent macroblocks are located in the same slice in accordance with an embodiment of the present invention.

FIG. 3 shows a flow diagram of a method for determining whether adjacent macroblocks are located in the same slice in accordance with an embodiment of the present invention. In this embodiment, a memory space LastMB is reserved to store and trace the slice changing point during the deblocking process of the block-based digital image. For description purpose, it will be alternatively referred as the slice changing point LastMB. In step 302 the slice changing point LastMB is initialized to −1 and sets the current macroblock $MB_{Cur}$ to the first macroblock in the block-based image (the macroblock sequence number is 0). In step 304 the current macroblock $MB_{Cur}$ is decoded. In step 306 an encoded bit-stream of the block-based digital image is checked to determine whether the current slice changes (for example, referring to FIG. 1, changes from Slice0 to Slice1, or from Slice1 to Slice2 etc), i.e., to determine if the slice containing the current macroblock $MB_{Cur}$ changes and is different from that of the previous one (for example, the left macroblock $MB_A$ illustrated in FIG. 2). If the current slice changes, then step 308 is executed to set the slice changing point LastMB to the sequence number of the current macroblock $MB_{Cur}$ minus 1; otherwise, the flow proceeds directly to step 310. It should be noted that the determining step 306 is performed by examining the incoming content of the encoded bits-stream of the block-based digital image, for example, by checking if there is more raw byte sequence payload (e.g. by invoking the more_rbsp_data( ) function defined in the H.264 or similar protocol) or by checking the status of the end_of_slice_flag. If there is more RBSP (raw byte sequence payload), for example, then it may conclude that the current slice does not yet change. In step 310 the slice changing point LastMB is compared with the sequence number of the left macroblock $MB_A$, and decides whether to deblock the boundary between the current macroblock $MB_{Cur}$ and its left neighbor $MB_A$ according to the comparison result. If the former (the slice changing point LastMB) is smaller than the latter (the sequence number of the left macroblock $MB_A$), then it means that the current macroblock $MB_{Cur}$ and its left macroblock $MB_A$ are located in the same slice and the deblocking process for the two adjacent macrobloks ($MB_{Cur}$ and $MB_A$) must be performed; otherwise, if the former is greater than or equal to the latter, then it means that the two adjacent macrobloks ($MB_{Cur}$ and $MB_A$) lie in different slices and it may skip the deblocking process therefor. In step 312 the slice changing point LastMB is compared with the sequence number of the top macroblock $MB_B$, and decides whether to deblock the boundary between the current macroblock $MB_{Cur}$ and its top neighbor $MB_B$ according to the comparison result. The determining criterion is similar to step 310, i.e., if the former (the slice changing point LastMB) is smaller than the latter (the sequence number of the top macroblock $MB_B$), then it means that the current macroblock $MB_{Cur}$ aid its top macroblock $MB_B$ are located in the same slice and the deblocking process for the two adjacent macroblocks ($MB_{Cur}$ and $MB_B$) must be performed; otherwise, if the former is greater than or equal to the latter, then it means that the two adjacent macroblocks ($MB_{Cur}$ and $MB_B$) lie in different slices and it may skip the deblocking process therefor. In step 314, checking whether the current macroblock $MB_{Cur}$ is the last one in the current picture; if so, then the flow for the current picture is ended and may consider next picture; otherwise, the current macroblock may be set to the next macroblock, and the flow jumps back to step 304 and proceeds. The sequence number of a macroblock may be replaced with any sequence characteristic number assigned to the macroblock, for example, the sequence characteristic number may start other than 0 and the difference of adjacent sequence characteristic numbers may be larger than 1. This variation is also applicable to all following embodiments.

Figure 4:
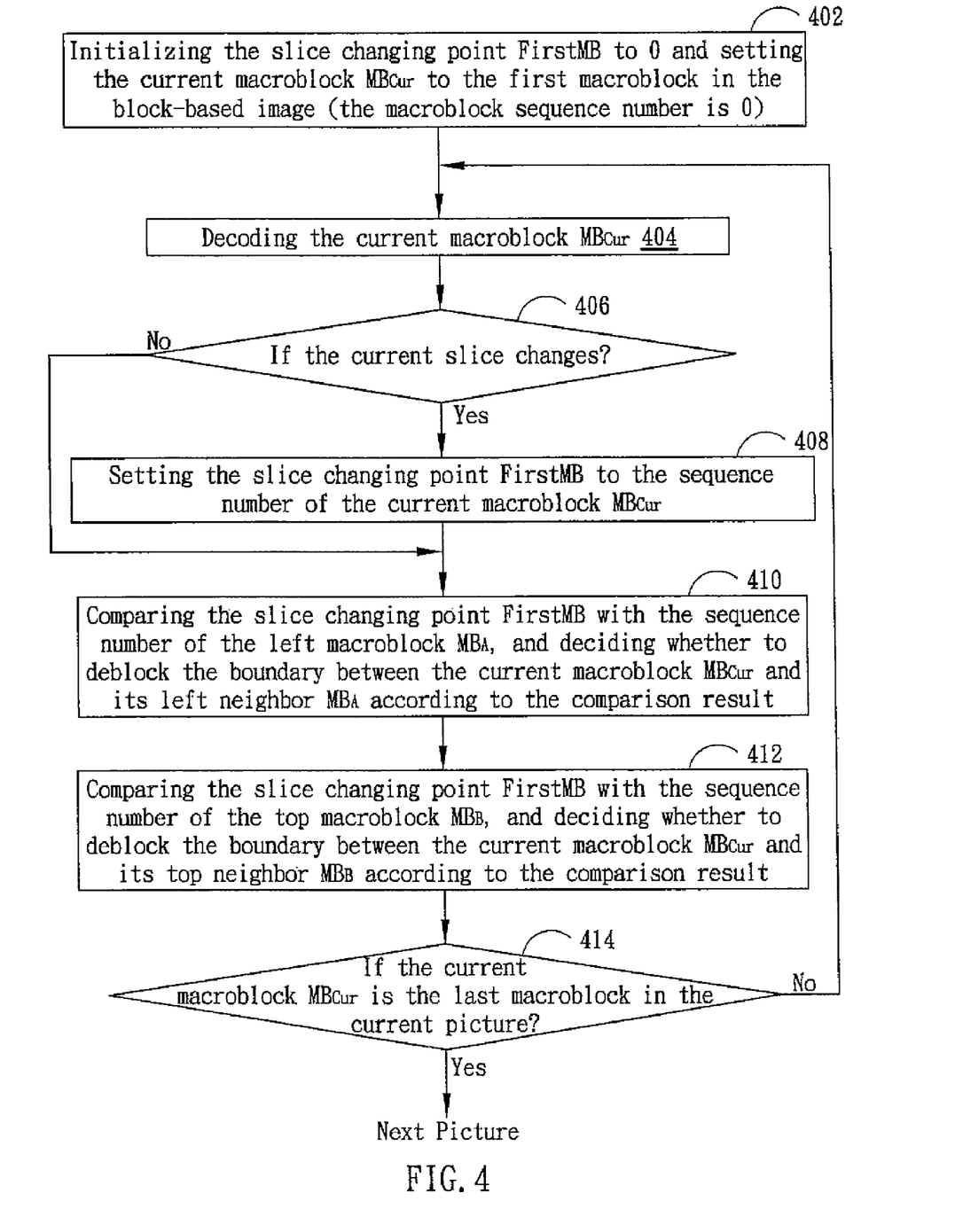
FIG. 4 shows the flow diagram of the method for determining whether adjacent macroblocks are located in the same slice in accordance with another embodiment of the present invention.

FIG. 4 shows the flow diagram of the method for determining whether adjacent macroblocks are located in the same slice in accordance with another embodiment of the present invention. In this embodiment, a memory space FirstMB is also reserved to store and trace the slice changing point during the deblocking process of the block-based digital image. Likewise, it will be alternatively referred as the slice changing point FirstMB for description purpose. In step 402 the slice changing point FirstMB is initialized to 0 and sets the current macroblock $MB_{Cur}$ to the first macroblock in the block-based image (the macroblock sequence number is 0). In step 404 the current macroblock $MB_{Cur}$ is decoded. In step 406 an encoded bit-stream of the block-based digital image is checked to determine whether the current slice changes (for example, referring to FIG. 1, changes from Slice0 to Slice1, or from Slice1 to Slice2 etc), i.e., to determine if the slice containing the current macroblock $MB_{Cur}$ changes and is different from that of the previous one (for example, the left macroblock $MB_A$ illustrated in FIG. 2). If the current slice changes, then step 408 is executed to set the slice changing point FirstMB to the sequence number of the current macroblock $MB_{Cur}$; otherwise, the flow proceeds directly to step 410. Similarly, whether the slice changes or not in the determining step 406 may be according to the status of RBSP or the end_of_slice_flag in the encoded bits-stream of the block-based digital image. In step 410 the slice changing point FirstMB is compared with the sequence number of the left macroblock $MB_A$, and decides whether to deblock the boundary between the current macroblock $MB_{Cur}$ and its left neighbor $MB_A$ according to the comparison result. If the former (the slice changing point FirstMB) is less than or equal to the latter (the sequence number of the left macroblock $MB_A$), then it may conclude that the current macroblock $MB_{Cur}$ and its left macroblock $MB_A$ are located in the same slice. In step 412 the slice changing point FirstMB is compared with the sequence number of the top macroblock $MB_B$, and decides whether to deblock the boundary for the current macroblock $MB_{Cur}$ and its top neighbor $MB_B$ according to the comparison result. If the former (the slice changing point FirstMB) is less than or equal to the latter (the sequence number of the top macroblock $MB_B$), then it may conclude that the current macroblock $MB_{Cur}$ and its top macroblock $MB_B$ both lie in the same slice. Similar to the aforementioned embodiment, if the current macroblock $MB_{Cur}$ and its adjacent macroblock $MB_A$ (respectively $MB_B$) are determined to lie in different slices in step 410 (respectively step 412), then the deblocking process therefor may be optionally skipped. In step 414 checking whether the current macroblock $MB_{Cur}$ is the last one in the current picture; if so, then the flow for the current picture is ended and may consider next picture; otherwise, the current macroblock may be set to the next macroblock, and the flow jumps back to step 404 and proceeds.

Figure 5A:
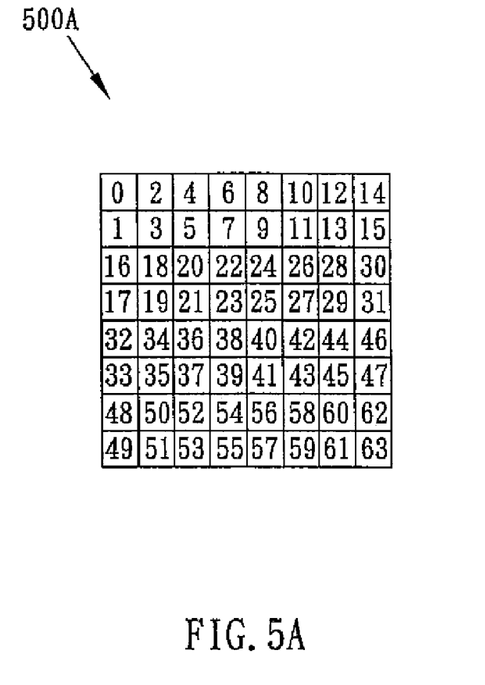
FIG. 5A illustrates the macroblock sequence number assigning manner for a picture encoded in MBAFF mode.
Figure 5B:
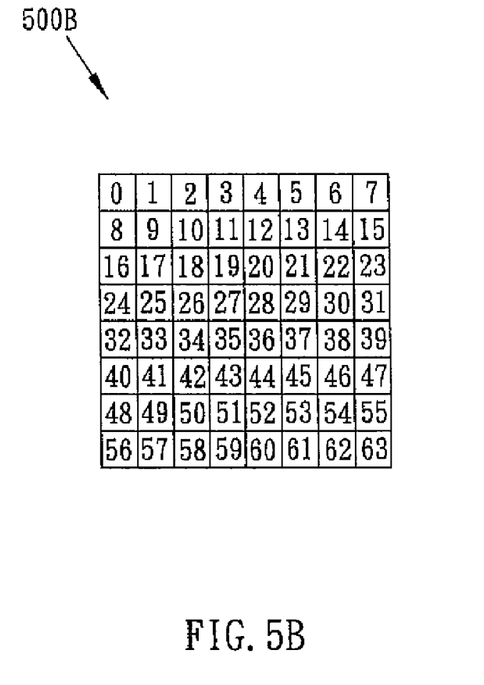
FIG. 5B illustrates the macroblock sequence number assigning manner for a picture encoded in regular (non-MBAFF) mode.

To enhance the coding efficiency of dynamic and static area in a motion picture, the coding standard such as H.264 may encode each vertically adjacent macroblock pair in either frame mode or field mode. This special coding mechanism is generally called the macroblock adaptive frame/field coding which is hereinafter referred as "MBAFF" for short. A slice in an MBAFF coded image would include a plurality of macroblock pairs with the macroblock sequence number assigning manner different from non-MBAFF images. FIG. 5A and FIG. 5B illustrate different macroblock sequence number assigning manners between an MBAFF coding image 500A and a regular coding image 500B. For convenience, the pictures illustrated in FIG. 5A and FIG. 5B both contain 64 (8×8) macroblocks, which should not be construed as a limit to the scope of the present invention. As can be noted in FIG. 5B, the macroblock sequence numbers of the regular picture 500B increase from left to right and then from top to bottom. With the MBAFF coded image 500A, however, adjacent sequence numbers are assigned to MBAFF macroblock pairs, and the numbers increase from left to right and then top to bottom based on macroblock pairs as shown in FIG. 5A.

Figure 6:
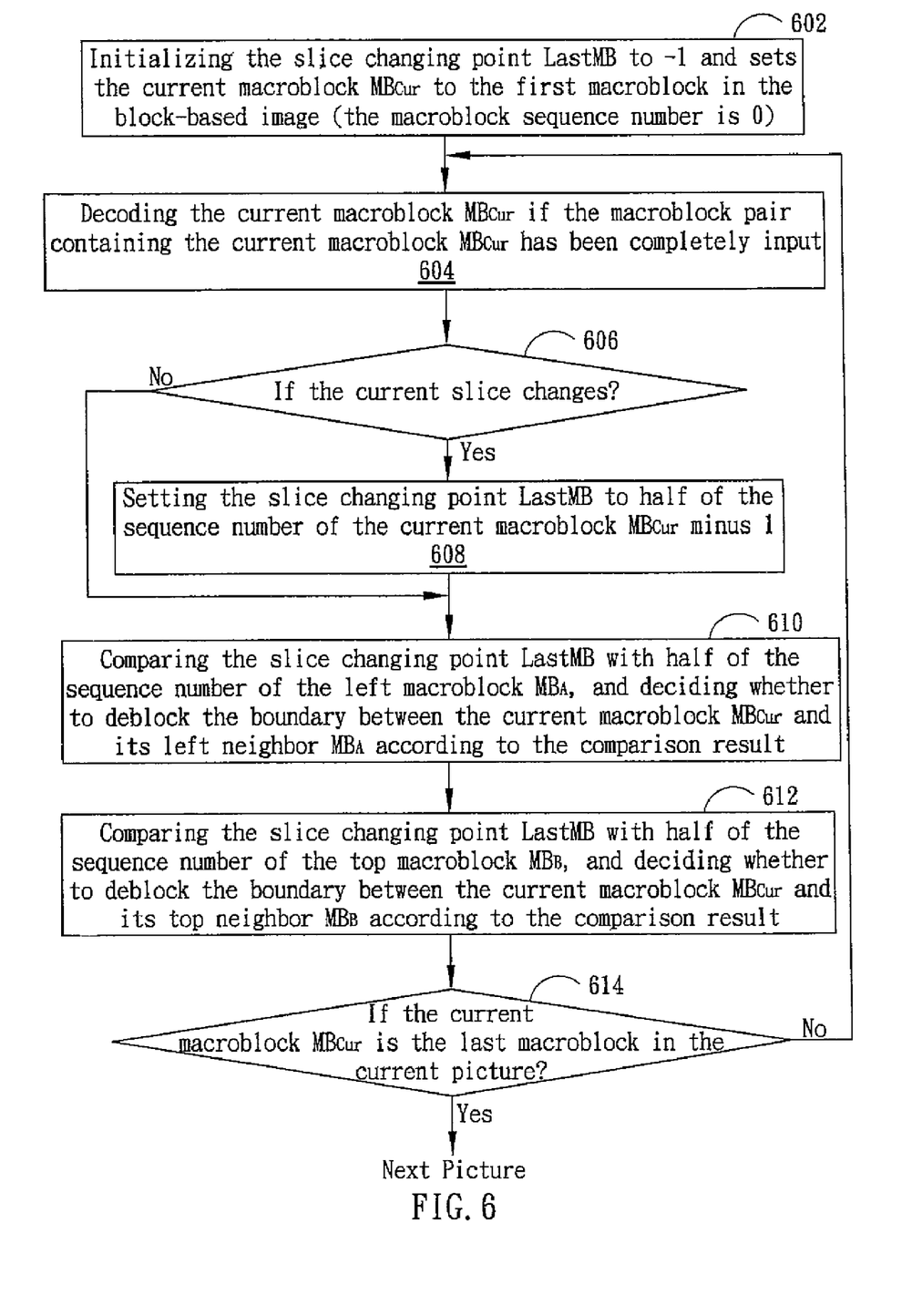
FIG. 6 shows a flow diagram of a method for determining whether adjacent macroblocks are located in the same slice in accordance with an embodiment of the present invention, which is directed to block-based digital images encoded in MBAFF mode.

For the block-based digital images encoded in MBAFF mode, the recording manner of the slice changing point is a little bit different from the foregoing embodiments. FIG. 6 shows a flow diagram of a method for determining whether adjacent macroblocks are located in the same slice in accordance with an embodiment of the present invention, which is directed to block-based digital images encoded in MBAFF mode. In step 602 the slice changing point LastMB is initialized to −1 and sets the current macroblock $MB_{Cur}$ to the first macroblock in the block-based image (the macroblock sequence number is 0). In step 604 checking if the data of the macroblock pair containing the current macroblock $MB_{Cur}$ has been completely input; if so, then decodes the current macroblock pair. In step 606 an encoded bit-stream of the block-based digital image is checked to determine whether the current slice changes (for example, referring to FIG. 1, changes from Slice0 to Slice1, or from Slice1 to Slice2 etc), i.e., to determine if the slice containing the current macroblock $MB_{Cur}$ changes and is different from that of the previous one (for example, the left macroblock $MB_A$ illustrated in FIG. 2). If the current slice changes, then step 608 is executed to set the slice changing point LastMB to half of the sequence number of the current macroblock $MB_{Cur}$ minus 1; otherwise, the flow proceeds directly to step 610. Similarly whether the slice changes or not in the determining step 606 may be according to the status of RBSP or the end_of_slice_flag in the encoded bits-stream of the block-based digital image. In step 610 the slice changing point LastMB is compared with half of the sequence number of the left macroblock $MB_A$, and decides whether to deblock the boundary between the current macroblock $MB_{Cur}$ and its left neighbor $MB_A$ according to the comparison result. If the former (the slice changing point LastMB) is less than the latter (half of the sequence number of the left macroblock $MB_A$), then it may conclude that the current macroblock $MB_{Cur}$ and its left macroblock $MB_A$ are located in the same slice. In step 612 the slice changing point LastMB is compared with half of the sequence number of the top macroblock $MB_B$, and decides whether to deblock the boundary between the current macroblock $MB_{Cur}$ and its top neighbor $MB_B$ according to the comparison result. If the former (the slice changing point LastMB) is less than the latter (half of the sequence number of the top macroblock $MB_B$), then it may conclude that the current macroblock $MB_{Cur}$ and its top macroblock $MB_B$ both lie in the same slice. Similar to the aforementioned embodiments, if the current macroblock $MB_{Cur}$ and its adjacent macroblock $MB_A$ (respectively $MB_B$) are determined to lie in different slices in step 610 (respectively step 612), then the deblocking process therefor may be optionally skipped. In Step 614 checking whether the current macroblock $MB_{Cur}$ is the last one in the current picture; if so, then the flow for the current picture is ended and may consider next picture; otherwise, the current macroblock may be set to the next macroblock, and the flow jumps back to step 604 and proceeds.

Figure 5C:
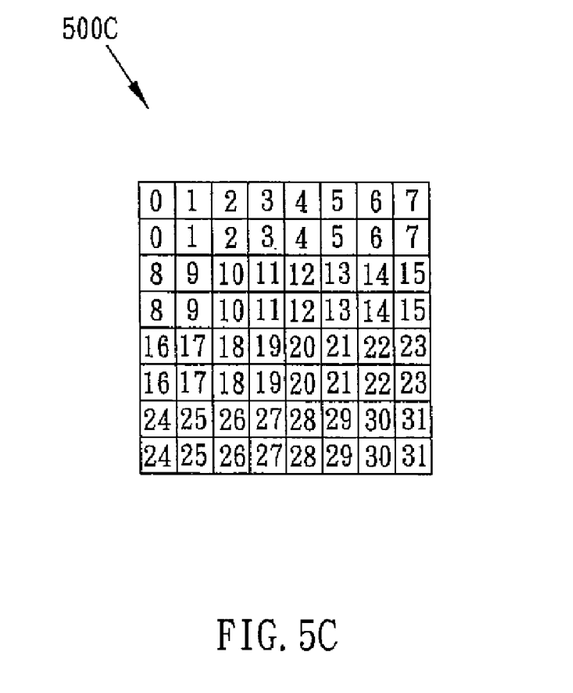
FIG. 5C illustrates the transformed macroblock sequence numbers of the picture encoded in MBAFF mode in accordance with an embodiment of the present invention.

In the embodiment shown in FIG. 6, it is equivalent to consider that all macroblock sequence numbers of MBAFF pictures are divided by 2 (the remainder is neglected) before applying the flow shown in FIG. 3. FIG. 5C shows the macroblock sequence numbers of FIG. 5A after foregoing division transformation. As can be noted in FIG. 5C, macroblocks in the same macroblock pair will be assigned to the same sequence number after the divided-by-2 operation.

Figure 7:
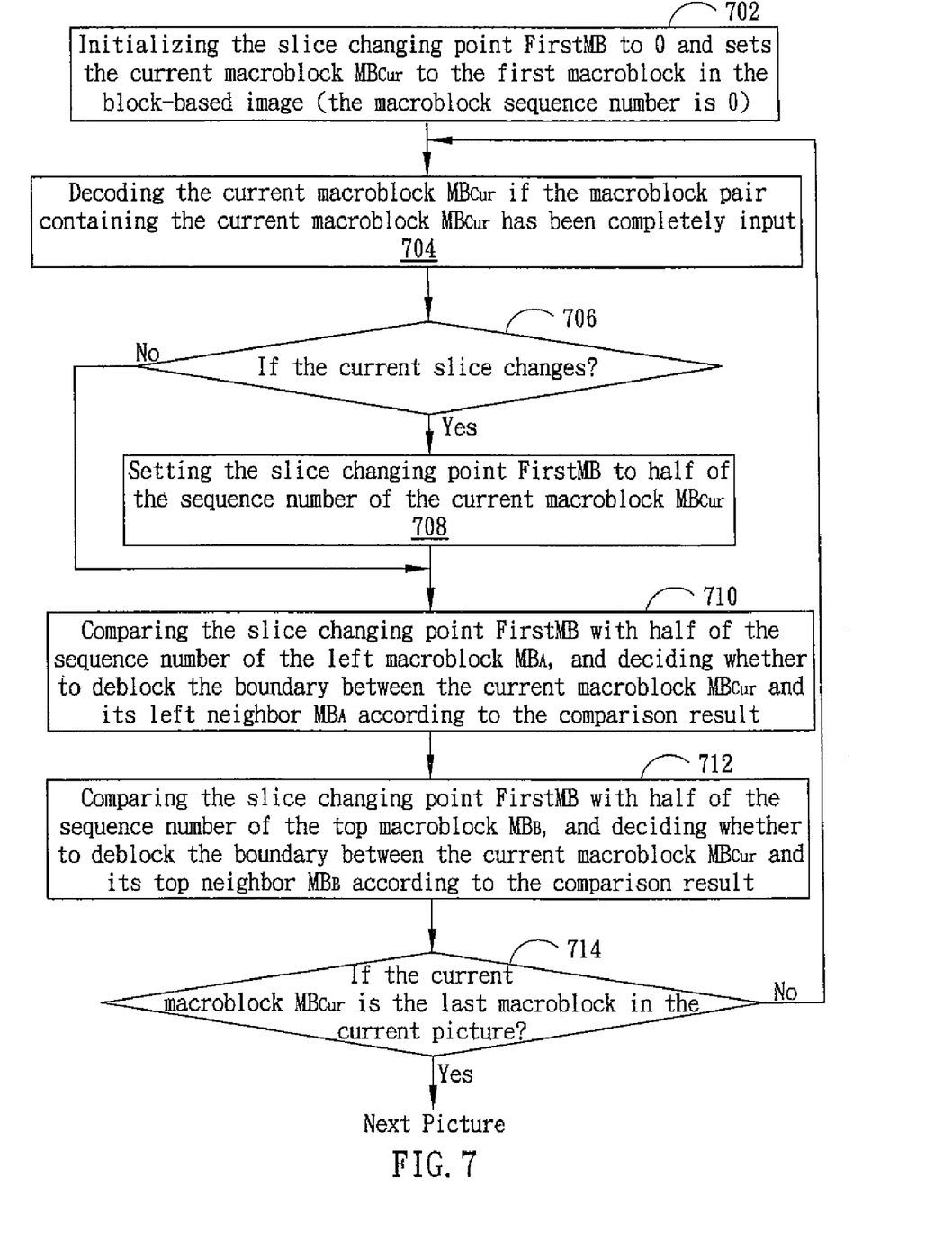
FIG. 7 shows the flow diagram of the method for determining whether adjacent macroblocks are located in the same slice in accordance with another embodiment of the present invention, which is directed to block-based digital images encoded in MBAFF mode.

FIG. 7 shows the flow diagram of the method for determining whether adjacent macroblocks are located in the same slice in accordance with another embodiment of the present invention, which is directed to block-based digital images encoded in MBAFF mode. In Step 702 the slice changing point FirstMB is initialized to 0 and sets the current macroblock $MB_{Cur}$ to the first macroblock in the block-based image (the macroblock sequence number is 0). In step 704 checking if the data of the macroblock pair containing the current macroblock $MB_{Cur}$ has been completely input; if so, then decodes the current macroblock pair. In step 706 an encoded bit-stream of the block-based digital image is checked to determine whether the current slice changes (for example, referring to FIG. 1, changes from Slice0 to Slice1, or from Slice1 to Slice2 etc), i.e., to determine if the slice containing the current macroblock $MB_{Cur}$ changes and is different from that of the previous one (for example, the left macroblock MBA illustrated in FIG. 2). If the current slice changes, then step 708 is executed to set the slice changing point FirstMB to half of the sequence number of the current macroblock $MB_{Cur}$; otherwise, the flow proceeds directly to step 710. Likewise, whether the slice changes or not in the determining step 706 may be according to the status of RBSP or the end_of_slice_flag in the encoded bits-stream of the block-based digital image. In step 710 the slice changing point FirstMB is compared with half of the sequence number of the left macroblock $MB_A$, and decides whether to deblock the boundary between the current macroblock $MB_{Cur}$ and its left neighbor $MB_A$ according to the comparison result. If the former (the slice changing point FirstMB) is less than or equal to the latter (half of the sequence number of the left macroblock $MB_A$), then it may conclude that the current macroblock $MB_{Cur}$ and its left macroblock $MB_A$ are located in the same slice. In step 712 the slice changing point FirstMB is compared with half of the sequence number of the top macroblock $MB_B$, and decides whether to deblock the boundary between the current macroblock $MB_{Cur}$ and its top neighbor $MB_B$ according to the comparison result. If the former (the slice changing point LastMB) is less than or equal to the latter (half of the sequence number of the top macroblock $MB_B$), then it may conclude that the current macroblock $MB_{cur}$ and its top macroblock $MB_B$ both lie in the same slice. Similar to the aforementioned embodiments, if the current macroblock $MB_{Cur}$ and its adjacent macroblock $MB_A$ (respectively $MB_B$) are determined to lie in different slices in step 710 (respectively step 712), then the deblocking process therefor may be optionally skipped. In step 714 checking whether the current macroblock $MB_{Cur}$ is the last one in the block-based digital image; if so, then the flow for the current picture is ended and may consider next picture; otherwise, the current macroblock may be set to the next macroblock, and the flow jumps back to step 704 and proceeds.

Likewise, in the embodiment shown in FIG. 7, it is equivalent to consider that all macroblock sequence numbers of MBAFF pictures are divided by 2 (the remainder is neglected) before applying the flow shown in FIG. 4.

Figure 8:
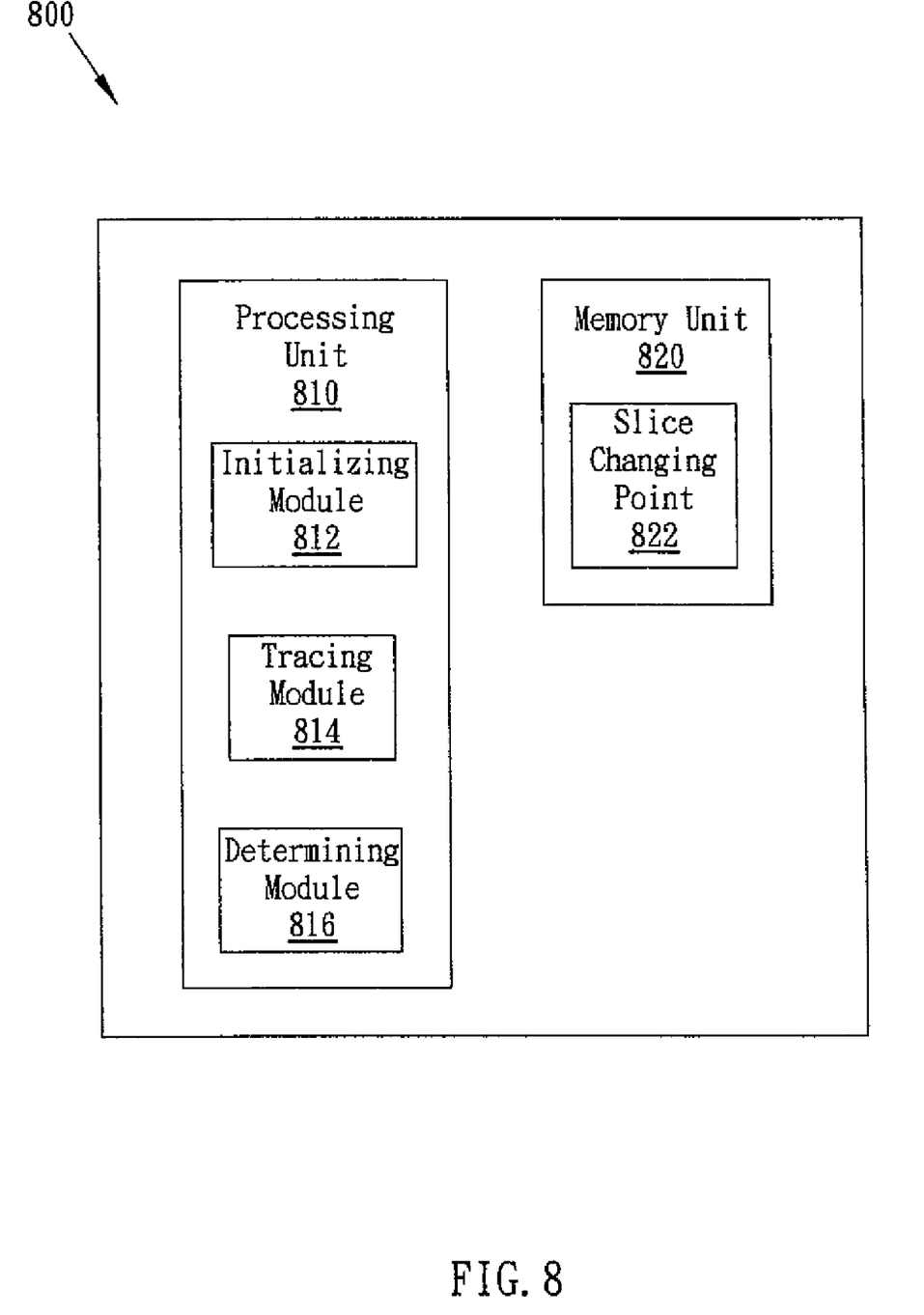
FIG. 8 shows the block diagram of the block-based digital image decoding apparatus in accordance with an embodiment of the present invention.

The present invention also discloses an apparatus for determining whether adjacent macroblocks are located in the same slice. FIG. 8 shows the block diagram of the block-based digital image decoding apparatus in accordance with an embodiment of the present invention, the apparatus including a processing unit 810 and a memory unit 820. The memory unit 820 includes a memory space for storing a slice changing point 822 which corresponds to the slice changing point LastMB or FirstMB in aforementioned embodiments. The processing unit 810 includes an initializing module 812, a tracing module 814 and a determining module 816. The initializing module 812 may execute the aforementioned steps 302, 402, 602 or 702, and initialize the slice changing point 822 to a predetermined initial value. The tracing module 814 examines the incoming encoded bit-stream, and may set the slice changing point 822 to a sequence characteristic derived number corresponding to the current macroblock when the current slice is determined to change (corresponding to steps 306, 308; 406, 408; 606, 608; and 706, 708). The determining module 816 determines whether the current macroblock and its adjacent macroblock lie in the same slice according to a comparison result of the sequence characteristic number of the adjacent macroblock and the slice changing point 822 (corresponding to steps 310, 312; 410, 412; 610, 612; and 710, 712). As can be noted from above embodiments, the adjacent macroblock of the current macroblock may be the left macroblock or the top macroblock of the current macroblock. The processing unit 810 may be, but not limit to, a central processing unit in a microprocessor (MP) based structure, a digital signal processor (DSP) based structure, or an application specific integrating circuit (ASIC). The initializing module 812, the tracing module 814 and the determining module 816 may be software modules in the MP based or DSP based structure, or logical components in an ASIC structure. Based on the disclosed method for determining whether adjacent macroblocks are located in the same slice, it should be easy for those skilled in the art to implement the desired software code or logical elements in company with the processing unit 810 as well as the memory unit 820 to embody the image decoding apparatus 800 capable of determining whether adjacent macroblocks lie in the same slice. The memory unit 820 may include a dynamic random access memory and a variety of read only memories to store program code and relative data for implementing the method in accordance with the present invention.

In aforementioned embodiments of the present invention, an initial value −1 means the slice changing point stores the last macroblock in previous slice (and that's why it is named LastMB); on the contrary, an initial value 0 means the slice changing point keeps the first macroblock in the current slice (and that's why it is named FirstMB).

The above examples and description have been provided only for the purpose of illustration, and are not intended to limit the invention in any way. A great variety of variations and modifications may carry out the present invention without exceeding the scope thereof. For example, the macroblock sequence number may be replaced with any sequence characteristic number defined for a macroblock. The sequence characteristic number does not necessarily start at 0 or increase by 1. Accordingly, in steps 302, 402, 602 and 702, the slice changing point LastMB or FirstMB may be initialized to different initial values when different scheme of sequence characteristic numbers is used. Moreover, in steps 308, 408, 608 and 708, the slice changing point may be updated by a derived value (e.g. half thereof, the value minus 1, half it then minus 1) derived from another well defined macroblock sequence characteristic number instead of the regular macroblock sequence number if the well defined macroblock sequence characteristic number is used to count macroblocks. Based on different sequence characteristic number recorded in the slice changing point, steps 310, 312, 410, 412, 610, 612, 710 and 712 should adjust the derived characteristic number of the adjacent macroblock used to compare with the slice changing point. The invention is to cover all modifications, alternate constructions and equivalents falling within the spirit and scope of the invention as expressed in the appended claims.

What is claimed is:

1. A method for determining whether two adjacent macroblocks are located in the same slice, the method being applicable to a specific process based on macroblocks for a block-based encoded image represented as an encoded bit-stream, each macroblock in the image being assigned a sequence characteristic number, the method comprising the steps of:

providing a memory space to store and trace a slice changing point;

initializing said slice changing point to a predetermined initial value;

decoding a current macroblock;

setting said slice changing point to a derived sequence characteristic number of a current macroblock when a current slice is determined to change by examining the encoded bit-stream, said derived sequence characteristic number being derived from said sequence characteristic number of the current macroblock; and determining whether the current macroblock and an adjacent macroblock of the current macroblock are located in the same slice according to a comparison result between said sequence characteristic number of the adjacent macroblock and said slice changing point;

wherein said predetermined initial value is −1, and said derived sequence characteristic number is said sequence characteristic number of the current macroblock minus 1, and said determining step determines that the current macroblock and the adjacent macroblock are located in the same slice when said slice changing point is less than said sequence characteristic number of the adjacent macroblock.

2. The method according to claim 1, wherein the adjacent macroblock is a left macroblock or a top macroblock of the current macroblock.

3. The method according to claim 1, wherein the block-based encoded image is encoded with H.264 protocol.

4. The method according to claim 1, wherein the specific process is a deblocking process.

5. The method according to claim 1, wherein said sequence characteristic number is a macroblock sequence number starting at 0 and increasing by 1 in a specific order.

6. The method according to claim 1, wherein whether the current slice changes or not is determined by examining whether there is more raw byte sequence payload (RBSP) or by examining value of end_of_slice_flag.

7. A block-based digital image decoding apparatus capable of determining whether two adjacent macroblocks are located in the same slice, the block-based digital image being represented as an encoded bit-stream, each macroblock in the block-based digital image being assigned a sequence characteristic number, the apparatus comprising:
a memory unit, providing a memory space to store and trace a slice changing point; and
a processing unit, comprising:
an initializing module, configured to initialize said slice changing point to a predetermined initial value;
a tracing module, configured to set said slice changing point to a derived sequence characteristic number of a current macroblock when a current slice is determined to change by examining the encoded bit-stream, said derived sequence characteristic number being derived from said sequence characteristic number of the current macroblock; and
a determining module, configured to determine whether the current macroblock and an adjacent macroblock of the current macroblock are located in the same slice according to a comparison result between said sequence characteristic number of the adjacent macroblock and said slice changing point;

wherein said predetermined initial value is −1, and said derived sequence characteristic number is said sequence characteristic number of the current macroblock minus 1, and said determining module determines that the current macroblock and the adjacent macroblock are located in the same slice when said slice changing point is less than said sequence characteristic number of the adjacent macroblock.

8. The apparatus according to claim 7, wherein the adjacent macroblock is a left macroblock or a top macroblock of the current macroblock.

9. The apparatus according to claim 7, wherein the block-based digital image is encoded with H.264 protocol.

10. The apparatus according to claim 7, wherein if said determining module determines that the current macroblock and the adjacent macroblock are located in different slice, then the apparatus skips a deblocking process for boundary between the current macroblock and the adjacent macroblock.

11. The apparatus according to claim 7, wherein said sequence characteristic number is a macroblock sequence number starting at 0 and increasing by 1 in a specific order.

12. The method according to claim 7, wherein said tracing module determines whether the current slice changes or not by examining whether there is more raw byte sequence payload (RBSP) or by examining value of end_of_slice_flag.

* * * * *